US009332388B1

(12) United States Patent
Johns

(10) Patent No.: US 9,332,388 B1
(45) Date of Patent: May 3, 2016

(54) HAND HELD DEVICE WITH AN INTEGRAL ACCESS CONTROL COMPONENT

(71) Applicant: Google Inc., Mountain View, CA (US)

(72) Inventor: Trevor Johns, San Mateo, CA (US)

(73) Assignee: Google Inc., Mountain View, CA (US)

( * ) Notice: Subject to any disclaimer, the term of this patent is extended or adjusted under 35 U.S.C. 154(b) by 71 days.

(21) Appl. No.: 13/650,266

(22) Filed: Oct. 12, 2012

(51) Int. Cl.
*G05B 19/00* (2006.01)
*H04W 4/02* (2009.01)
*G06Q 10/08* (2012.01)

(52) U.S. Cl.
CPC ............. *H04W 4/021* (2013.01); *G06Q 10/087* (2013.01)

(58) Field of Classification Search
CPC ... G07C 9/00087; H04W 4/021; H04W 40/20
USPC ............................................... 340/5.61, 10.4
See application file for complete search history.

(56) References Cited

U.S. PATENT DOCUMENTS

| | | | | |
|---|---|---|---|---|
| 6,384,709 | B2* | 5/2002 | Mellen et al. | 340/5.2 |
| 7,030,761 | B2* | 4/2006 | Bridgelall et al. | 340/572.2 |
| 7,659,823 | B1* | 2/2010 | Killian et al. | 340/572.4 |
| 8,640,513 | B2* | 2/2014 | Goren et al. | 70/279.1 |
| 2002/0147006 | A1* | 10/2002 | Coon | G08C 17/02 455/420 |
| 2003/0179073 | A1* | 9/2003 | Ghazarian | 340/5.6 |
| 2008/0107274 | A1* | 5/2008 | Worthy | 380/278 |
| 2009/0322890 | A1* | 12/2009 | Bocking et al. | 348/211.2 |
| 2011/0092159 | A1* | 4/2011 | Park et al. | 455/41.2 |
| 2012/0056722 | A1 | 3/2012 | Kawaguchi | |

* cited by examiner

*Primary Examiner* — Vernal Brown
(74) *Attorney, Agent, or Firm* — Shumaker & Sieffert, P.A.

(57) ABSTRACT

A composite device includes an RFID device and a controller. The controller allows the RFID to respond to a query from an external source only when the composite device is at a predetermined location. In this manner, a code associated with the RFID is not released by the RFID anywhere in the world except at the location of the query requester.

12 Claims, 3 Drawing Sheets

HAND HELD DEVICE WITH AN INTEGRAL ACCESS CONTROL COMPONENT

FIELD

This disclosure pertains to a hand-held device, such as a cell phone, with an electronic access control component that provides selectively a code in response to a query, for example, to allow the user of the device to gain access to a secure area. Preferably, the access control component is active only when the user is in the geographic vicinity of the security area.

BACKGROUND

Historically, access to certain secure areas, including offices, buildings, etc., was controlled using mechanical devices, such as keys, and the like. Advances in field of electronic security provided means of accessing secure areas using electronic devices, such as electric badges, fobs, etc. These electronic devices store an access code. When an electronic signal with a query is received by each device, each device responds with the access code. A security system (which normally generates the initial signal with the query) analyzes the access code received from a particular electronic device, and if the access code is acceptable, the user associated with the respective device is allowed access to the secure area, for example by opening a gate.

Such electronic devices have several distinct advantages for the users and the respective security units desiring to control the access. For example, electronic access devices can be smaller and lighter then mechanical keys and, therefore, can be carried easily.

From the security unit's point of view, electronic devices are advantageous because they are harder to duplicate then mechanical keys. Moreover, electronic devices can be used with sophisticated systems to control and/or keep track of who can access a secure area and when. For example, a security system can be set up to allow access to a first group of users at during one particular time period (e.g., weekday mornings), a second group of users at another particular time period (e.g., weekends), etc. Access to a particular secure area by a particular user may also be suspended or terminated by the security unit without the need to obtain the electronic device from the user.

A disadvantage of electronic devices of the kind just described is that they still must be carried separately, just like the old mechanical keys.

SUMMARY

In the present application, an access control device is described that is optionally incorporated as a component into a composite device including, in addition, a cell phone, a music player, a tablet, a pager, etc. In this manner, a user does not have to carry the access control device and the other device separately.

For example, a composite device may include a housing including a controller, a geographic locator selectively generating a geographic location signal indicative of the current geographic location of the body and an access control component selectively generating an access control signal for an external device. The access control component is selectively enabled by the controller, preferably only at or near a preset geographic location. On one example, the access control component has an active and a passive mode dependent on said current geographic location. The controller is configured to set said access control component to said active mode when said housing is near a predetermined geographic location.

In one example, the access control component is an RFID device.

In one example, the composite device of claim includes a memory disposed in the housing, the memory storing a code segment including a predetermined geographic location. Optionally, the memory is also used to store a code transmitted by the access control device.

In another example, a composite device includes an RFID device having an active and a passive mode, in said active mode, said RFID being responsive to an external query by generating an RF signal including a predetermined code, said RFID device being unresponsive to said external query in said passive mode. A controller adapted to selectively set said RFID device to one of said modes, the controller being configured to set said RFID device to said active mode only in near a predetermined geographic location.

In another example, the composite device also includes a geographic locator adapted to provide a geographic signal indicative a current geographic position. The controller sets said RFID device in accordance with said current geographic position.

In one example, the controller is adapted to set said RFID to said active state only when said composite device is near the location of the source of the query.

In one example, a memory is also provided in the composite device, the memory storing a geographic segment. The geographic location determines the predetermined geographic location.

BRIEF DESCRIPTION

DETAILED DESCRIPTION

Figure 1:
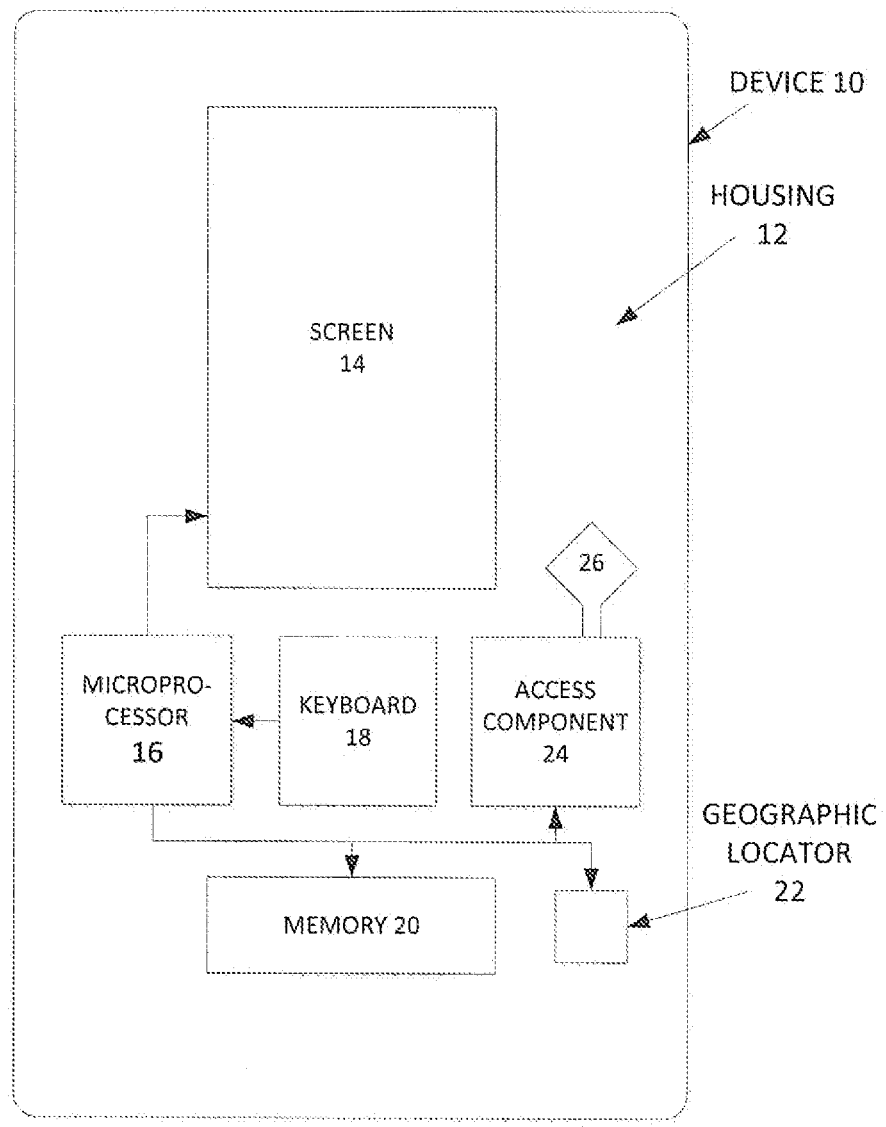
FIG. 1 shows a somewhat diagrammatic representation of a composite electronic device with security access device.

FIG. 1 shows a composite device 10 that may be used as a means of obtaining access to a secure area, as well as for other purposes. For example, the device 10 may be a cellular telephone, a portable audio or multimedia player, a tablet, etc. Device 10 includes a housing 12, a screen 14 for providing instructions and content to a user, a microprocessor 16, a keyboard 18, a memory 20 and, optionally a geographic locator 22. Memory 20 is used for storing programs used to operate the device 10 as well as data, as is conventional for such devices. The geographic locator 22 provides geographic information indicative of the current physical location of the device 10, using, for example, GPS signals from respective satellites, or other known means. For example, signals from cell towers are also used to determine current physical location. Frequently information from both GPS satellites and other sources are used.

Importantly device 10 further includes an access control component 24. The component 24 is activated, either automatically, or manually by a user, and, in response, it generates signals that are analyzed by an appropriate external security system. If these signals are accepted, the user of the composite device 10 is allowed access to a secure area. For example, the signals may include an access code that may be unique to the user, or alternatively, one or more groups of users may be provided with the same access code.

The access control component 24 could be an RF device such as an RFID circuit. Such devices can operate in a relative simple mode, or in a complex mode requiring the completion of a handshake protocol before access to the user of device 10.

The signals (typically RF signals) to and from the component 24 are received and transmitted by antenna 26. The antenna 26 may be shared with other components of device 10. Moreover, while a single antenna 26 is shown for both received and transmitted signals, separate antennas for these signals may be provided as well.

Figure 2:
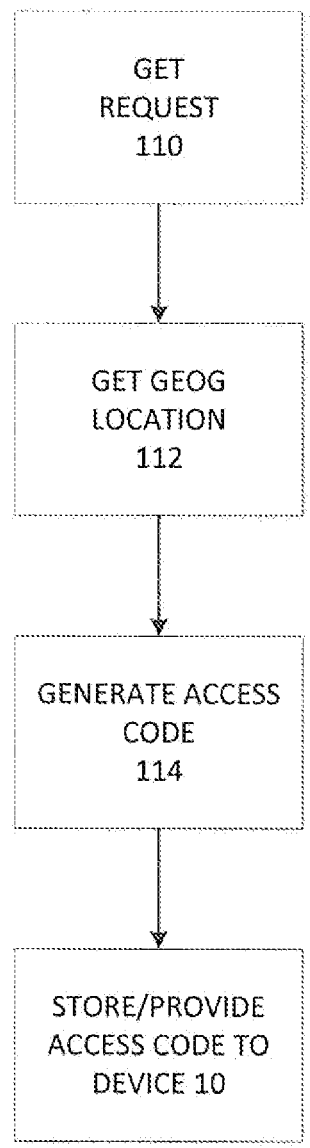
FIG. 2 shows a flow chart for setting up the device.

FIG. 2 shows a method of providing the security code for the device 10 by an appropriate authorization system. The authorization system is provided to insure that only authorized personnel are allowed entry into various secure areas. The authorization system performs certain checks and is normally operated only by security personnel to insure the integrity of the process, using predetermined protocols as desired.

In step 102 the authorization system gets a request for a security code for a particular individual. As discussed above, in some instances, either all, or a group of individuals may be assigned the same security code. In other instances, each individual user receives a unique access code. Moreover, the access code may be temporary or may change over time. In step 104, the authorizing system also receives geographic location information defining the physical location of the respective secure area. This information may be derived from local geographic locators (not shown), may be a predetermined parameter, etc.

In step 104 an access code is generated for device 10, including a separate geographic location segment.

In step 106 the access code is either stored directly into the device 10 (for example, the authorization system may have a docking station receiving device 10 for this purpose), or the access code is transmitted to the device 10 and it is stored in memory 120.

Figure 4:
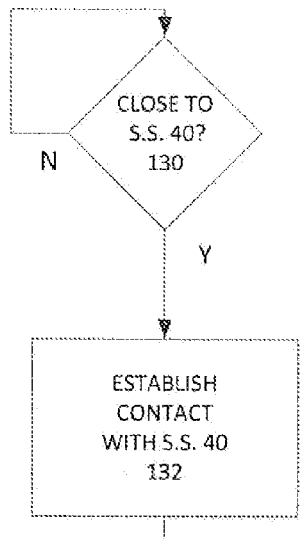
FIG. 4 shows a somewhat diagrammatic representation of a system used to implement the method of FIG. 3.
Figure 4:
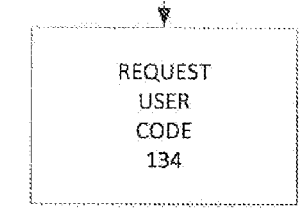
Figure 4:
Figure 4:
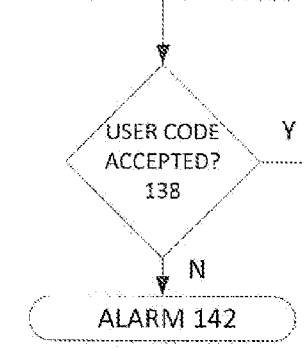
Figure 3:
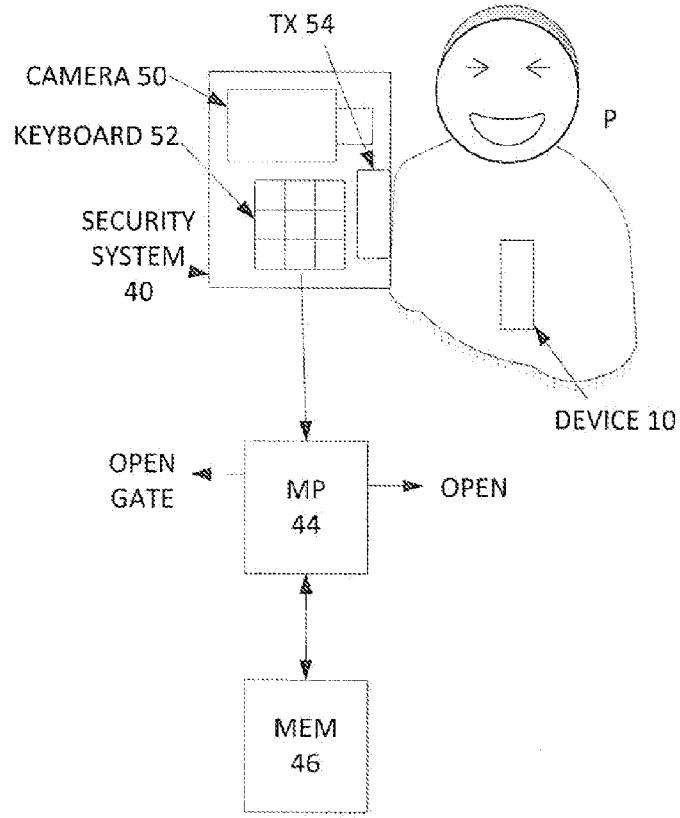
FIG. 3 shows a flow chart of a method providing access to a security area using the composite electronic device.

FIGS. 3 and 4 show how a user P associated with device 10 is provided access to a secure area. The user P can be holding the device 10 in his hand or store it in a pocket, a briefcase, a pocketbook, etc.

Access to the respective secure area is controlled by a security system 40 including a master station 42, a microprocessor 44 and a memory 46. It should be understood that the microprocessor 44 and memory 46 may be integrated into the master station 42, but are shown here as separate elements for the sake of clarity.

The master station 42 is provided for controlling one or more gates (not shown) or other access means and includes an optional camera 50, a keyboard 52 and a transceiver 54. Memory 46 contains codes specific to each user P, or a class of users together with rules (if any) setting forth when these users are allowed access to the associated secure area.

In one scenario, the access component 24 is a standard component based on an RFID chip or other similar technology such as a near field communication technology with the geographical locator 22 playing no part in providing access to a user. In this scenario, the component 24 may be powered by its own power supply, may share a power source with the rest of the elements of device 10, or may be powered by the received RF signals.

In this scenario, a user P approaches and activates the device 40. The device 40 sends out query signals through the transceiver 54. The access component 24 responds with the access code assigned to the user P. The microprocessor 44 analyzes the response, comparing the access code received from device 10 with codes stored in memory 46, if necessary.

If the user P is authorized to access the secure area, the system 40 sends out a signal that activates an appropriate audio or visual device (not shown), generates an activating signal to enable a gate (not shown) to open, etc. In some instances, in addition, to confirm that the user P is authorized, he may be required to enter a code on keyboard 52 and/or the camera 50 is used to acquire an image of P which is then analyzed in a conventional manner.

In a preferred scenario, as previously mentioned, the memory 20 is used to store the access code(s) for user P each access code being associated with, or including a geographic location segment associated with, or designating the geographic location of the security system 40. In this case, the microprocessor is adapted to disable the access component 24 so that it is normally in an inactive mode. While the access component is in an inactive mode, it does not react to any queries or any other signals. An advantage of this operation is that if an unauthorized person steals or temporary borrows the device 10, and tries to read or transfer the access code assigned to P, he can't do it since the access component 24 will not respond. Similarly, this person could not surreptitiously send a query signal to device 10 and obtain the access code.

However when the user P is close enough to the security system 40, as determined by locator 22 (e.g., within 10-20 feet), the access component 24 is activated. Referring to FIG. 4, in step 130 the microprocessor 16 in device 10 compares its current location, as indicated by the locator 22 with the location of the security system 40 as indicated by the geographic location segment of the access code. If the microprocessor 16 determines that it is geographically close to the security system 40 then in step 132 contact is established therewith. In step 134 a request is made by the security system 40 for the access code of user P. In step 136 the access code is sent to the security system 40.

In step 138 a check is performed by the security system 40 to determine if the access code is acceptable. If it is, then a gate is activated and the user can proceed to the secure area in step 140. If not, then in step 142, a visual, audible and/or other alarm is triggered.

Composite device 10 has been described as providing selective access to a secure area. Of course, it may also be used for many other purposes in a similar manner, such as providing access to special equipment (e.g., an ATM).

Devices incorporating RFID devices frequently do not include a battery or other power sources and therefore, frequently, the RFID uses the energy of any incoming query to power itself. However, in one example, the devices describe include a power supply, such as a battery, shared by the other device and the RFID.

Numerous modifications can be made to the described systems without departing from the scope as defined herein.

I claim:

1. A portable device comprising:
   a radio frequency identification device having an active and a passive mode, wherein, when operating in the active mode, the radio frequency identification device is configured to respond to an external query by at least generating a radio frequency signal including a predetermined code, and wherein, when operating in the passive mode, the radio frequency identification device is configured to not respond to the external query;
   a geographic locator configured to generate a geographic location signal indicative of a current geographic location of the portable device; and
   a controller configured to determine, based on the geographic location signal, the current location of the portable device, in response to determining that the current geographic location of the portable device is near a predetermined geographic location, set the radio frequency identification device to the active mode, and, in response to determining that the current geographic location of the portable device is not near the predetermined location, setting the radio frequency identification device to the passive mode.

2. The portable device of claim 1, wherein the controller is further configured to set the radio frequency identification device to the active mode in response to determining that the current geographic location is near a location of a source of the external query.

3. The portable device of claim 1, further comprising:
a memory configured to store the predetermined code.

4. The portable device of claim 1, further comprising:
a housing including the radio frequency identification device and the controller,
wherein the controller is configured to enable the radio frequency identification device to respond to the query with the predetermined code only if the current geographic location of the portable device matches a facility location, wherein the predetermined code provides access to the facility location.

5. A method comprising:
determining, by a portable device, a current location of the portable device;
determining, by the portable device, whether the current location of the portable device is near a predetermined geographic location;
responsive to determining that the current location of the portable device is near a predetermined geographic location, setting, by the portable device, a radio frequency identification device of the portable device to an active mode, wherein the radio frequency identification device of the portable device responds to an external query while operating in the active mode; and
responsive to determining that the current location of the portable device is not near a predetermined geographic location, setting, by the portable device, the radio frequency identification device of the portable device to a passive mode, wherein the radio frequency identification device of the portable device does not respond to the external query while operating in the passive mode;
receiving, by the portable device, the external query;
if the radio frequency identification device is operating in the active mode, responding to the external query by at least generating a radio frequency signal including a predetermined code; and
if the radio frequency identification device is operating in the passive mode, refraining from responding to the external query.

6. The method of claim 5, further comprising:
determining, by the portable device, whether the current location of the portable device is near a source of the external query,
wherein setting the radio frequency identification device of the portable device to the active mode is further in response to determining that the current location of the portable device is near the source of the external query.

7. The method of claim 5, wherein responding to the external query further comprises retrieving, by the portable device and from a memory of the portable device, the predetermined code.

8. The method of claim 5,
wherein the predetermined location is a facility location,
wherein determining whether the current location of the portable device is near the predetermined location includes determining whether the current location of the portable device is near the facility location, and
wherein the predetermined code provides access to a facility at the facility location.

9. A non-transitory computer-readable memory encoded with instructions that, when executed by a processor of a portable device, cause the processor to:
determine a current location of the portable device;
determine whether the current location of the portable device is near a predetermined geographic location;
responsive to determining that the current location of the portable device is near a predetermined geographic location, set a radio frequency identification device of the portable device to an active mode, wherein the radio frequency identification device of the portable device responds to an external query while operating in the active mode; and
responsive to determining that the current location of the portable device is not near a predetermined geographic location, set the radio frequency identification device of the portable device to a passive mode, wherein the radio frequency identification device of the portable device does not respond to the external query while operating in the passive mode;
receive the external query;
if the radio frequency identification device is operating in the active mode, respond to the external query by at least generating a radio frequency signal including a predetermined code; and
if the radio frequency identification device is operating in the passive mode, refrain from responding to the external query.

10. The non-transitory computer-readable memory of claim 9, further encoded with instructions to cause the processor to:
determine whether the current location of the portable device is near a source of the external query,
wherein the instructions further cause the processor to set the radio frequency identification device of the portable device to the active mode in response to determining that the current location of the portable device is near the source of the external query.

11. The non-transitory computer-readable memory of claim 9, further encoded with instructions to cause the processor to:
respond to the external query by at least retrieving, from a memory of the portable device, the predetermined code.

12. The non-transitory computer-readable memory of claim 9,
wherein the predetermined location is a facility location,
wherein determining whether the current location of the portable device is near the predetermined location includes determining whether the current location of the portable device is near the facility location, and
wherein the predetermined code provides access to a facility at the facility location.

* * * * *